(12) United States Patent
Bevilacqua

(10) Patent No.: US 12,352,359 B2
(45) Date of Patent: Jul. 8, 2025

(54) BUTTERFLY VALVE WITH VARIABLE CONFIGURATION ELASTIC GASKET

(71) Applicant: Sterivalves S.R.L., Lucca (IT)

(72) Inventor: Raffaello Bevilacqua, Uzzano (IT)

(73) Assignee: Sterivalves S.R.L., Lucca (IT)

( * ) Notice: Subject to any disclaimer, the term of this patent is extended or adjusted under 35 U.S.C. 154(b) by 0 days.

(21) Appl. No.: 18/286,666

(22) PCT Filed: Apr. 12, 2022

(86) PCT No.: PCT/IT2022/050095
§ 371 (c)(1),
(2) Date: Oct. 12, 2023

(87) PCT Pub. No.: WO2022/224285
PCT Pub. Date: Oct. 27, 2022

(65) Prior Publication Data
US 2024/0200665 A1    Jun. 20, 2024

(30) Foreign Application Priority Data
Apr. 19, 2021   (IT) .......................... 102021000009890

(51) Int. Cl.
*F16K 1/226*    (2006.01)

(52) U.S. Cl.
CPC .................. *F16K 1/2266* (2013.01)

(58) Field of Classification Search
CPC ................... F16K 1/226–2268; F16K 27/0218
USPC ................. 251/305–308, 174, 192
See application file for complete search history.

(56) References Cited

U.S. PATENT DOCUMENTS

| 3,737,144 | A | * | 6/1973 | Duncan | F16K 1/22 251/307 |
| 4,653,725 | A | * | 3/1987 | Nanz | F16K 1/2263 251/301 |
| 5,535,986 | A | * | 7/1996 | Hutchens | F16K 1/2266 251/306 |
| 5,865,210 | A | * | 2/1999 | Fort | F16K 27/0218 251/367 |
| 7,448,593 | B2 | * | 11/2008 | Lasse | F16K 1/2265 285/365 |
| 2012/0227833 | A1 | | 9/2012 | Hansen et al. | |
| 2016/0208929 | A1 | | 7/2016 | Hill | |

FOREIGN PATENT DOCUMENTS

CN    106870745 A    6/2017
DE    2625262 A1    12/1977

OTHER PUBLICATIONS

Int'l Search Report and Written Opinion, PCT/IT2022/050095, Jul. 12, 2022.

* cited by examiner

*Primary Examiner* — John Bastianelli
(74) *Attorney, Agent, or Firm* — Quantum Patent Law Firm; Seongyoune Kang

(57) ABSTRACT

A butterfly valve having a disc shutter that engages a gasket whose configuration varies according to the action exerted on its external perimeter by a plurality of pressers sliding in the thickness of the valve body.

12 Claims, 3 Drawing Sheets

BUTTERFLY VALVE WITH VARIABLE CONFIGURATION ELASTIC GASKET

TECHNICAL FIELD

The present invention belongs to the technical field of valves and in particular, but not exclusively, to the technical field of valves used to regulate and intercept the flow of pulverulent, or otherwise loose, products.

More precisely, the present invention belongs to the technical field of butterfly valves, used in the field of transferring products in powder form.

In particular, it is a butterfly valve, in which the gasket of the sealing seat of the shutter can adopt different configurations.

Present Status of the Art

As known, butterfly valves are devices for intercepting the flow of material thanks to the movement of a flat shutter, generally discoidal in shape, which rotates alternately between an open position, in which it lies parallel to the longitudinal axis of the valve, and a closed position in which it lies transversely to the same axis; in the closed position the perimeter edge of the shutter is engaged in a sealing seat formed circumferentially on the inner surface of the valve body.

To improve the tightness, a gasket of elastomeric material is usually housed in the sealing seat.

In its rest configuration, the latter protrudes towards the inside of the passage section, so that when the disc-shaped shutter is in the closed position, its perimeter interferes with the gasket and the latter elastically deforms in order to perfectly adhere to the perimeter edge of the shutter and seal the passage section.

CN106870745 discloses a butterfly valve in which the gasket is pushed against the perimeter edge of the actuator by a plurality of springs, to improve the airtight sealing.

Proper operation of this type of device involves some rubbing between the shutter and the gasket, resulting in progressive wear and tear of the latter.

In dynamic applications, with repeated contacts between the gasket surface and the shutter, the cause of gasket deterioration that is most difficult to avoid is abrasion, which is technically also called "shedding". This term refers to the wear of gaskets due to sliding contact surfaces; it is a dangerous phenomenon because excessive wear may suddenly cause deeper lacerations, resulting in multi-point cracks and, consequently, the dispersion of the product into the environment.

This phenomenon is aggravated by poor lubrication or if the surface of the shutter is too rough; in the pharmaceutical sector, contamination of the product by abrasive particles also often occurs.

To overcome this problem, tubular, inflatable toroidal gaskets have been developed, which are only inflated when the shutter is in the closed position, while when the shutter rotates around its axis the gasket is kept deflated and retracted, so as not to interfere with the edge of the shutter and significantly reduce the wear of the gasket itself.

Examples of butterfly valves with inflatable gaskets can be found in DE2625262 and US2012227833.

The main drawback of valves with inflatable gasket is the need to connect them to a compressed air supply system and the necessity to empty them rapidly, moreover in case of their breakage the flow of compressed air inevitably comes into contact with the product and vice versa, with serious risks of environmental contamination.

US2016208929 discloses a valve having a flexible gasket that is pressed against the shutter by a plurality of pivoting actuator arms, the latter being actuated by pneumatic means.

OBJECTS AND SUMMARY OF THE INVENTION

The object of the present invention is to provide a butterfly valve with a variable configuration gasket that can be used without the use of compressed air.

A further object of the present invention is to provide a butterfly valve with a variable configuration gasket that can operate independently of compressed air, not only with respect to changing the configuration of the gasket, but also with respect to operating the valve itself.

Not least object of the present invention is to provide a valve suitable for use with chemical-pharmaceutical products, i.e. with all surfaces in contact with the product that can be easily cleaned and with the internal surface designed so as to avoid the formation of recesses in which product residues can accumulate.

These and other objectives are achieved by means of a butterfly valve comprising a cylindrical valve body, inside of which is rotationally connected a disc shutter movable between an open position, in which the plane defined by the disc is parallel to the longitudinal axis of the valve body, and a closed position, in which the disc is rotated by a quarter of an angle with respect to the open position so as to transversally close the passage section of the valve body, said disc engaging a sealing seat formed circumferentially in the internal surface of the valve body.

The rotation axis of the disc lies diametrically on a plane orthogonal to the longitudinal axis of the valve.

In order to make the closure hermetic, an elastic gasket with a variable configuration is housed in the sealing seat, i.e. a gasket whose radial protrusion from the internal surface of the valve body can be modified at will.

In other words, the gasket forms a circumferential projection that, when the shutter is in the closed position, first surrounds the perimeter edge of the disc, leaving it free to rotate, and then, thanks to the action exerted by appropriate mobile pressers, expands to embrace the whole perimeter of the disc shutter in order to prevent any leakage.

Preferably, the cross-section of the gasket is conformed as a letter "C" with the convexity facing inwardly towards the valve body, i.e., towards the longitudinal axis thereof, and with the concavity defining a circumferential channel in the face of the gasket facing outwardly.

Along the perimeter of the gasket, in the thickness of the valve body, a plurality of radial passages are defined, along which slide flat pressers, whose distal ends are shaped as arcs of circumference and come out from the internal surface of the valve body until they engage the circumferential channel defined in the external face of the gasket.

A first configuration is defined with the pressers retracted, in which the toroidal gasket surrounds the edge of the disc shutter without touching it, and a second configuration with the pressers extracted that push the gasket against the perimeter edge of the disc.

The best results are obtained by reducing the spaces between the distal ends of the pressers, so that when they are in the extracted configuration the thrust exerted on the toroidal seal is almost constant along the entire circumference.

Usually, but not necessarily, the disc shutter has a discoidal shape (i.e. a circular shape).

DETAILED DESCRIPTION OF AN EMBODIMENT OF THE INVENTION

Figure 1:
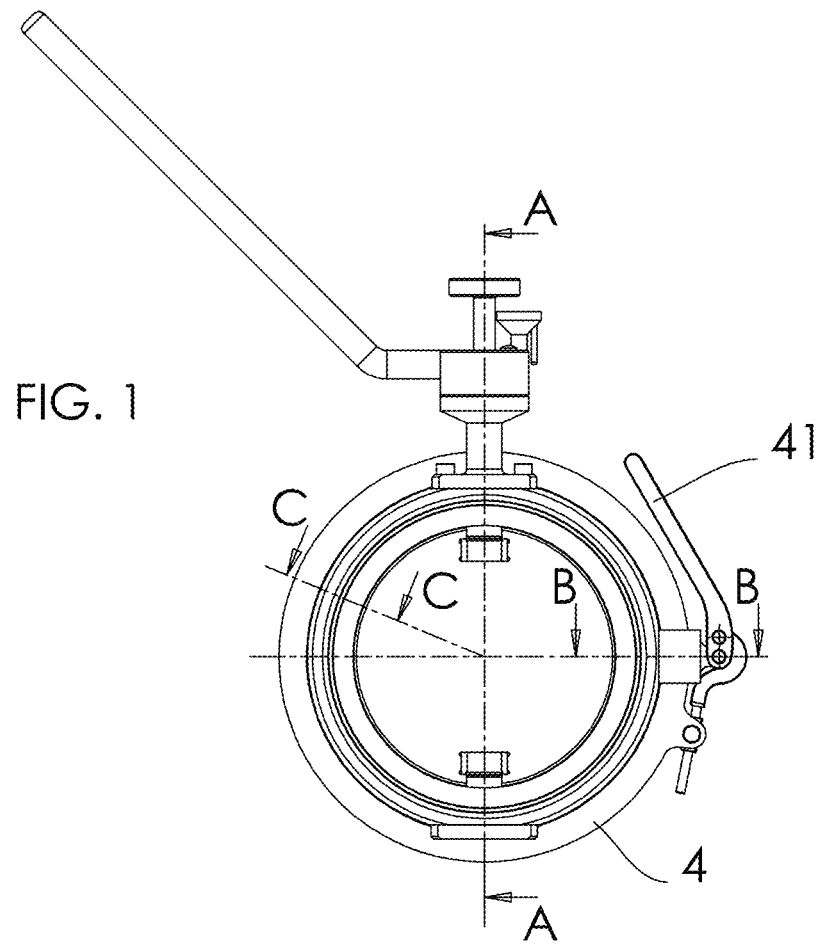
FIG. 1 shows a top, lateral, view of the assembled valve.
Figure 2:
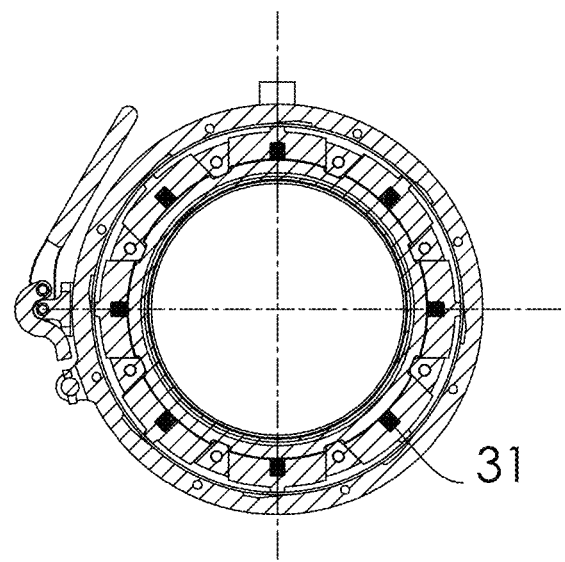
FIG. 2. shows a view of the assembled valve, cross-sectioned according to plane G-G, shown in FIG. 4, orthogonal to the longitudinal axis (X) of the valve body.
Figure 3:
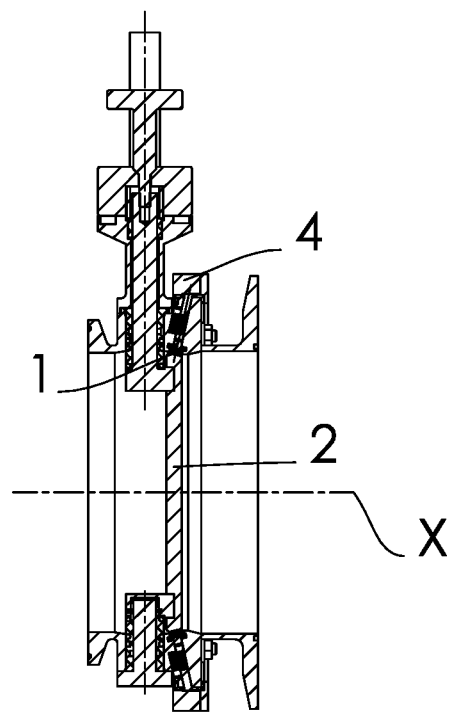
FIG. 3 shows a view of the assembled valve, cross-sectioned according to the diametrical plane A-A, shown in FIG. 1, on which the longitudinal axis (X) of the valve body lies.
Figure 4:
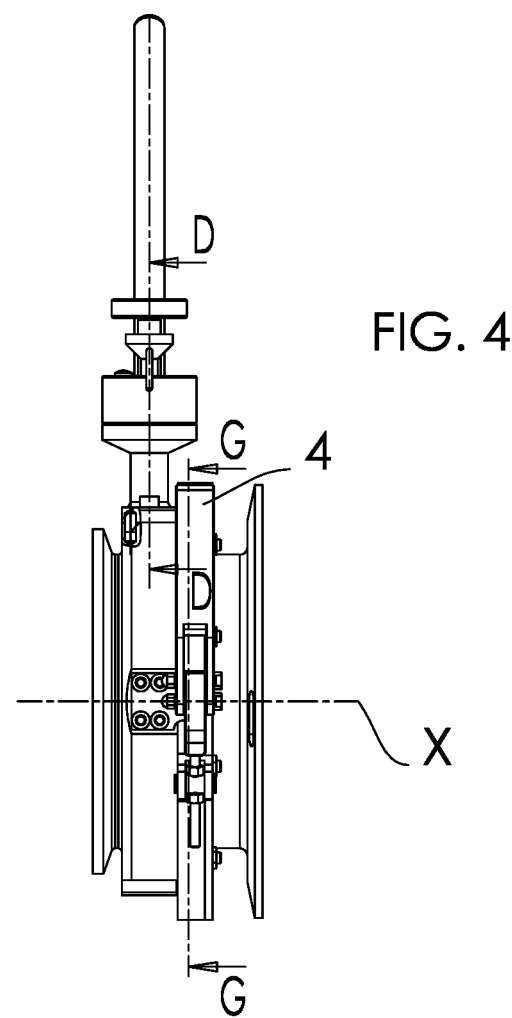
FIG. 4 shows a side view of the assembled valve.
Figure 5:
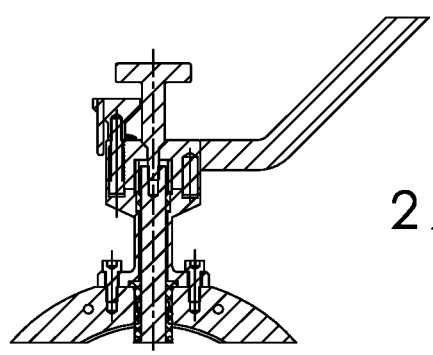
FIG. 5 shows a view of the assembled valve, cross-sectioned according to the D-D plane shown in FIG. 4.
Figure 6:
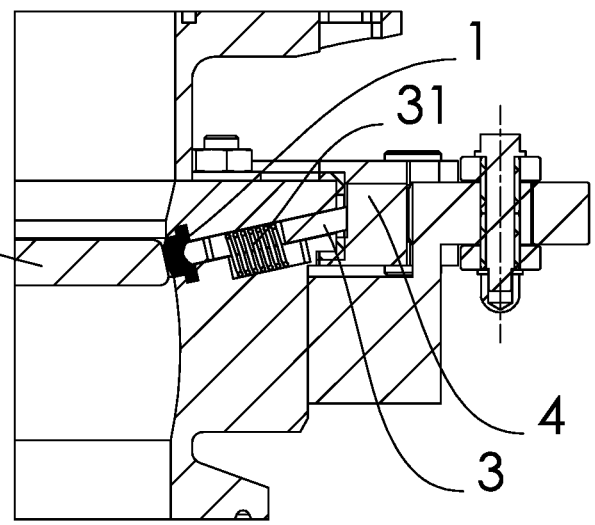
FIG. 6 shows a view of the assembled valve, cross-sectioned according to the B-B plane shown in FIG. 1.
Figures 7, 8:
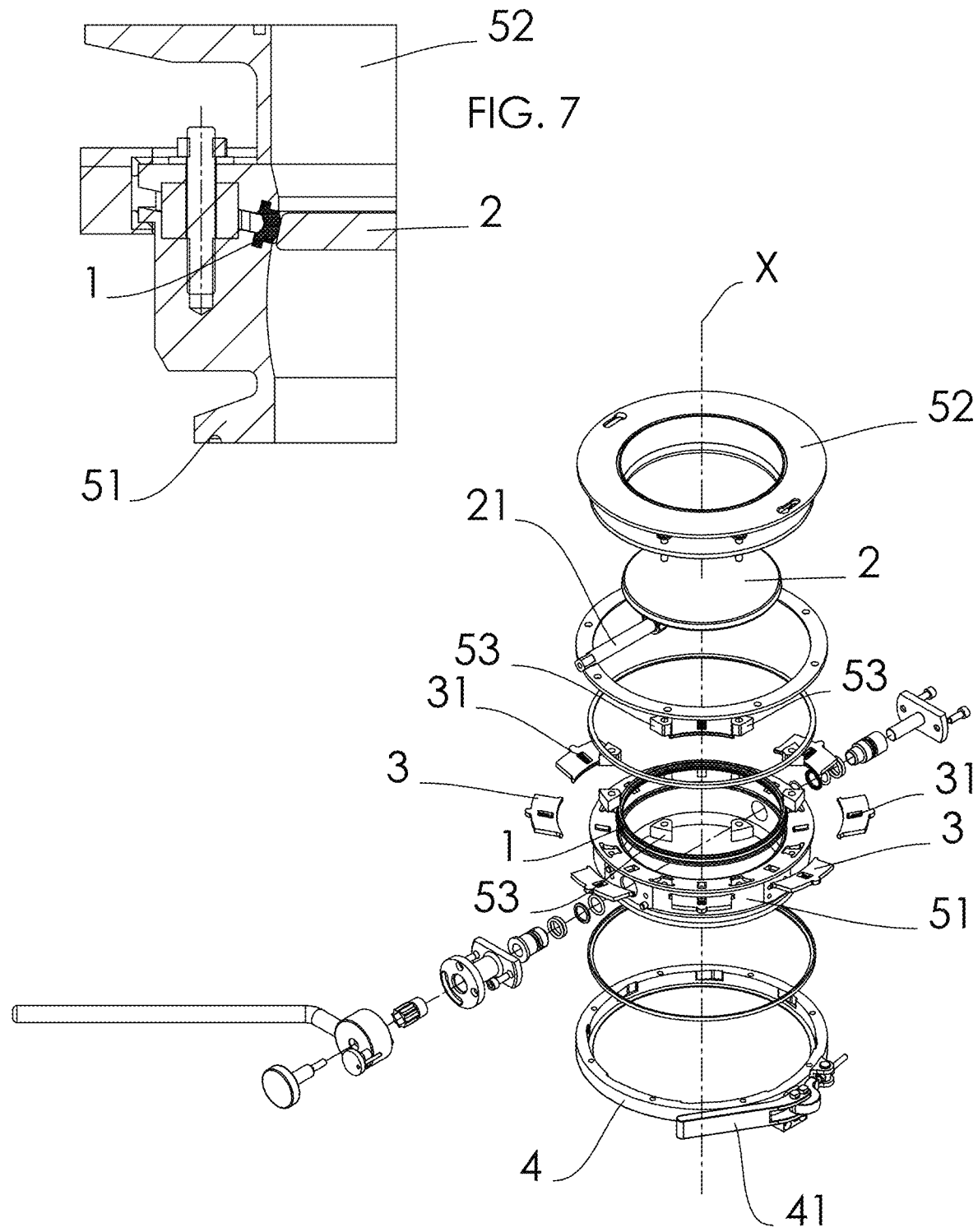
FIG. 7 shows a view of the assembled valve, cross-sectioned according to the C-C plane shown in FIG. 1.
FIG. 8 shows an exploded view of the invention with the disc shutter (2) in transverse closed position.

In the embodiment shown in the figures, the present invention comprises a butterfly valve with a tubular body inside which is housed a disc shutter (2), integrally connected to a rotation half-shaft (21), which rotates according to a transverse axis diametrically crossing the valve body.

The shutter rotates, passing cyclically from an open position, in which the disc lies parallel to the longitudinal axis (X) of the valve, to a closed position in which the disc lies orthogonal to the longitudinal axis (X).

In the closed position the perimeter edge of the disc engages in a toroidal gasket (1) whose conformation varies by virtue of the action exerted by the distal ends of a plurality of pressers (3) that slide along corresponding housings defined in the thickness of the walls of the valve body, passing reversibly from a retracted configuration, in which they do not exert forces on the perimeter edge of the gasket, to an extracted configuration in which they push the toroidal gasket against the perimeter edge of the disc.

The toroidal gasket is housed in a corresponding sealing seat defined circumferentially on the inside surface of the valve body.

The axis of rotation of the shutter does not lie on the plane defined by the disc, to prevent the housing of the half-shaft from interfering with the sealing seat of the disc.

In the embodiment shown in the figures, the cross-section of the toroidal gasket is shaped as a letter "C" with the convexity facing the inside of the valve body and the concavity facing the wall of the valve body, so as to form on the outer wall of the gasket a circumferential channel in which the distal ends of the pressers engage. The latter move toward the inside of the valve due to the pushing action exerted on their proximal portions by a clamping collar (4) that opens and closes with the movement of a lever (41).

The extraction of the pressers towards the inside of the valve pushes the toroidal gasket against the perimeter edge of the disc, hermetically sealing the valve.

When the valve is reopened it is necessary to disengage the gasket from the disc and for this reason the clamping collar is reopened, leaving the pressers free to return to the retracted configuration, however the clamping collar is not able to exert a returning action on the pressers, which is delegated to the elasticity of the toroidal gasket which naturally tends to restore its original configuration.

The embodiment shown in the figures is particularly elaborated because each presser is coupled to a further, respective, elastic means of contrast (31) that has the function of retracting it by making it slide outwards, integrating the pushing action exerted by the toroidal gasket.

In the embodiment shown in the figures, the valve body consists of a lower half-body (51) that cooperates with an upper half-body (52), the two half-bodies are coaxially superimposed and are separated by a plurality of angular spacers (53), together with which they define the housings along which the pressers slide.

The invention claimed is:

1. A butterfly valve, comprising:
   a tubular valve body having a longitudinal axis, an internal surface on which a sealing seat is circumferentially defined, and a thickness whereinin which corresponding housings are defined,
   a disc shutter having a perimetral edge and being rotationally connected inside said tubular valve body,
   a toroidal gasket of elastomeric material housed in said corresponding sealing seat circumferentially defined on an internal surface of said tubular valve body,
   a plurality of pressers each having a proximal portion and a distal portion, the plurality of pressers slidingly coupled along the corresponding housings defined in the thickness of said tubular valve body,
   a clamping collar configured to open and close with movement of a lever and configured to exert a pushing action on the proximal portions of said pressers when the clamping collar is closed,
   wherein said disc shutter is movable between an open position in which a plane defined by said disc shutter lies parallel to a longitudinal axis of said tubular valve body and a closed position in which said disc shutter lies orthogonally to the longitudinal axis, and
   wherein the perimetral edge of the disc shutter is configured to engage with an inner perimetral face of said toroidal gasket, said toroidal gasket being deformable from action exerted on an outer perimetral face of the toroidal gasket by the distal portions of said plurality of pressers slidingly coupled along the corresponding housings defined in the thickness of said tubular valve body,
   wherein said pressers are movable towards said longitudinal axis of said tubular valve body by virtue of a thrust action exerted on the proximal portions by said clamping collar and reversibly movable in an opposite direction by at least an elastic contrast action exerted by said toroidal gasket, and
   wherein said tubular valve body comprises a lower tubular half-body and an upper tubular half-body that are coaxial to each other and are longitudinally separated by a plurality of angular spacers which form said housings along which said pressers slide.

2. The butterfly valve of claim 1, wherein one or more of said pressers is retractable between a first retracted configuration in which the toroidal gasket surrounds the perimetral edge of the disc shutter without touching the perimetral edge of the disc shutter, and a second configuration in which the pressers are extracted and push the toroidal gasket against the perimetral edge of the disc shutter.

3. The butterfly valve of claim 2, wherein a cross section of said toroidal gasket is shaped like a letter "C", wherein the convexity of the cross section faces the longitudinal axis of the tubular valve body and wherein the concavity of the cross section defining a circumferential channel in an outward-facing face of said toroidal gasket faces outwards.

4. The butterfly valve of claim 3, wherein distal ends of said pressers engage in said circumferential channel defined in said outward-facing face of said toroidal gasket.

5. The butterfly valve of claim 4, wherein said clamping collar is elastically deformable.

6. The butterfly valve of claim 3, wherein said clamping collar is elastically deformable.

7. The butterfly valve of claim 2, wherein said clamping collar is elastically deformable.

8. The butterfly valve of claim 1, wherein a cross section of said toroidal gasket is shaped like a letter "C", wherein the convexity of the cross section faces the longitudinal axis of the tubular valve body and wherein the concavity of the cross section defining a circumferential channel in an outward-facing face of said toroidal gasket faces outwards.

9. The butterfly valve of claim 8, wherein distal ends of said pressers engage in said circumferential channel defined in said outward-facing face of said toroidal gasket.

10. The butterfly valve of claim 9, wherein said clamping collar is elastically deformable.

11. The butterfly valve of claim 8, wherein said clamping collar is elastically deformable.

12. The butterfly valve of claim 1, wherein said clamping collar is elastically deformable.

* * * * *